US010970570B2

United States Patent
Kaltenhaeuser (10) Patent No.: US 10,970,570 B2
(45) Date of Patent: Apr. 6, 2021

(54) DEVICE AND A METHOD FOR CLUSTERING LIGHT SPOTS

(71) Applicant: Aptiv Technologies Limited, St. Michael (BB)

(72) Inventor: Robert Kaltenhaeuser, Wuppertal (DE)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 16/352,124

(22) Filed: Mar. 13, 2019

(65) Prior Publication Data

US 2019/0303694 A1 Oct. 3, 2019

(30) Foreign Application Priority Data

Mar. 27, 2018 (EP) .................................... 18164154

(51) Int. Cl.
| | | |
|---|---|---|
| B60Q 1/04 | (2006.01) | |
| B60L 1/14 | (2006.01) | |
| G06K 9/00 | (2006.01) | |
| B60Q 1/14 | (2006.01) | |
| G08G 1/16 | (2006.01) | |
| H05B 45/10 | (2020.01) | |

(52) U.S. Cl.
CPC ......... *G06K 9/00825* (2013.01); *B60Q 1/143* (2013.01); *G08G 1/166* (2013.01); *H05B 45/10* (2020.01)

(58) Field of Classification Search
CPC .. B60R 1/00; B60R 2300/10; G06K 9/00825; G06K 9/6223; G06K 9/6278; H05B 45/10; B60Q 1/143; G08G 1/166
See application file for complete search history.

(56) References Cited

U.S. PATENT DOCUMENTS

| | | | | |
|---|---|---|---|---|
| 2012/0287276 | A1* | 11/2012 | Dwivedi ............ | G06K 9/00825 348/148 |
| 2014/0293055 | A1* | 10/2014 | Otsuka .................. | G08G 1/166 348/148 |
| 2016/0034771 | A1* | 2/2016 | Schamp ............ | G06K 9/00805 348/148 |
| 2016/0328629 | A1* | 11/2016 | Sinclair ................ | H04N 5/2253 |
| 2018/0033160 | A1* | 2/2018 | Ishigami ................ | G01C 15/00 |
| 2018/0056996 | A1* | 3/2018 | Lee ...................... | B60T 8/17557 |
| 2018/0319319 | A1* | 11/2018 | Moizumi ................ | B60Q 1/14 |

OTHER PUBLICATIONS

Hsu-Yung Cheng et al: "Vehicle tracking in daytime and nighttime traffic surveillance videos", Jun. 22, 2010, pp. V5-122-V5-125.
Jianqiang Wang et al.: "A Region Tracking-Based Vehicle Detection Algorithm in Nighttime Traffic Scenes", Dec. 2, 2013, pp. 16474-16493.

(Continued)

*Primary Examiner* — Minh D A
(74) *Attorney, Agent, or Firm* — Colby Nipper PLLC (57) ABSTRACT

A device for clustering light spots, the device is configured to receive an image captured by a camera, detect light spots in the image, calculate a distance measure for each of a plurality of pairs of light spots detected in the image, and group the detected light spots to clusters based on the calculated distance measures.

25 Claims, 3 Drawing Sheets

(56) References Cited

OTHER PUBLICATIONS

Yen-Lin Chen et al: "Nighttime Vehicle Detection for Driver Assistance and Autonomous Vehicles", Jan. 1, 2006, pp. 687-690.
Hsu-Yung Chen et al: "Intelligent Highway Traffic Surveillance With Self-Diagnosis Abilities", Dec. 1, 2011, pp. 1462-1472.
Yen-Lin Chen et al: "Real-time vision-based multiple vehicle detection and tracking for nighttime traffic surveillance", Oct. 11, 2009, pp. 3352-3358.
Y.-M. Chan et al: "Vehicle detection and tracking under various lighting conditions using a particle filter", Mar. 1, 2012, pp. 1-8.
Jose C Rubio et al: "Multiple-Target Tracking for Intelligent Headlights Control", Jun. 1, 2012, pp. 594-605.
Fossati, et al., "Real-Time Vehicle Tracking for Driving Assistance", Mar. 2011, 9 pages.
Guo, et al., "Preceding Vehicle Detection and Tracking Adaptive to Illumination Variation in Night Traffic Scenes Based on Relevance Analysis", Aug. 2014, 23 pages.
Pham, et al., "A two-stage approach for front-view vehicle detection and counting at nighttime", Jan. 2016, 6 pages.
Taha, et al., "Multi Objects Tracking in Nighttime Traffic Scenes", May 2015, pp. 8-16, 9 pages.
Wang, et al., "A Region Tracking-Based Vehicle Detection Algorithm in Nighttime Traffic Scenes", Dec. 2013, 20 pages.

\* cited by examiner

DEVICE AND A METHOD FOR CLUSTERING LIGHT SPOTS

TECHNICAL FIELD OF INVENTION

This disclosure generally relates to a device and a method for clustering light spots.

BACKGROUND OF INVENTION

A task of camera based Advanced Driver Assistance Systems (ADAS) applications, e.g., advanced headlight control, is to detect headlights and tail lights of other vehicles at night in order to switch on and off high beam in car or trucks automatically. The control of the high beam depends on whether other vehicles are detected ahead or not.

The traffic ahead of the vehicle is caught by a camera. The images captured by the camera are analyzed in order to detect headlights and tail lights of other vehicles. For complexity reduction and better performance, lights can be grouped together to pairs or clusters, e.g., all lights of one car or lights of a group of cars can be grouped together.

In current state of the art technology handpicked rules are used for the pairing and/or clustering of headlights and tail lights in image data. However, those rules may not be optimal. In addition, these rules are not flexible.

Recent work in this field has been published in the following documents:

Fossati, P. Schönmann, P. Fua: Real-time vehicle tracking for driving assistance, Machine Vision and Applications, 22, 2, pp. 439-448, 2011, J. Guo, J. Wang, X. Guo, C. Yu, X. Sun: Preceding Vehicle Detection and Tracking Adaptive to Illumination Variation in Night Traffic Scenes Based on Relevance Analysis, Sensors 2014, 14, pp. 15325-15347, 2014, V.-H. Pham, D.-H. Le: A two-stage approach for front-view vehicle detection and counting at nighttime, 2016 7th International Conference on Mechanical, Industrial, and Manufacturing Technologies (MIMT 2016), Image Processing and Visualization, 08001, 2016, M. Taha, H. H. Zayed, T. Nazmy, M. E. Khalifa: Multi Objects Tracking in Nighttime Traffic Scenes, ICIT 2015 The 7th International Conference on Information Technology, pp. 8-16, 2015, and J. Wang, X. Sun, J. Guo: A Region-Based Vehicle Detection Algorithm in Nighttime Traffic Scenes, Sensors 2013, 13, pp. 16474-16493, 2013.

SUMMARY OF THE INVENTION

It is an underlying object of the invention to provide a device for clustering light spots, wherein the device generates results with a high accuracy, especially in scenes with a high amount of light spots. It is further an object of the invention to provide a system that comprises the device and a method for clustering light spots.

The object underlying the invention is satisfied by the features of the independent claims. Advantageous further developments and aspects of the invention are set forth in the dependent claims.

In a first aspect of the instant application a device for clustering light spots is provided.

The device is configured to receive one or more images captured by a camera. In particular, the camera may be mounted on a vehicle and captures images of the road scene and, in particular, the traffic in front of the vehicle. The device is further configured to detect light spots in one or more images received from the camera. Pairs can be formed from the light spots detected in one of the images. For each of a plurality of pairs of the detected light spots, the device calculates a distance measure. Afterwards, the device groups the detected light spots to clusters or objects based on the calculated distance measures.

The distance measure quantifies the dissimilarity between light spots and allows a comparison as to which cluster of light spots a respective light spot fits best. The distance measure takes on a large value for dissimilar light spots and a small value for similar light spots. For example, if the distance measure of one of the light spots to a first cluster is smaller than the distance measure of this light spot to a second cluster, then the light spot fits better to the first cluster. A cluster may comprise one light spot or two or more light spots.

The distance measure can be understood as a function of the inverse of a similarity measure. The similarity measure takes on a small value for dissimilar light spots and a large value for similar light spots.

The device generates results with a high accuracy. Especially in scenes with a high amount of light spots, a clustering of the light spots into several clusters of car lights can be desirable since the output of some clusters may be more useful and computationally performant than a huge amount of light pairs. For this task, the distant measure which measures the dissimilarity between the light spots and thus allows to assign a light spot to the most suitable cluster of light spots is far more useful.

With the distance measure, it is possible to evaluate and compare to which cluster of lights a single light source fits best, thus making it possible to shift from a pure pairing process to a more flexible and practical clustering process.

In one embodiment, the device calculates the distance measure for a respective pair of light spots based on at least one feature of the two light spots of the respective pair. The distance measure then quantifies the dissimilarity of the two light spots of the respective pair of light spots with respect to the at least one feature. For example, the distance measure may be calculated based the difference of the blob areas, i.e., the area sizes, of the two light spots. In this example, the distance measure quantifies the dissimilarity of the two light spots with respect to the difference of their blob areas. The distance measure may also be calculated on the basis of two or more features of the light spots.

The at least one feature, on which the calculation of the distance measure is based, may be at least one feature from the following group of features: a difference in blob area of the two light spots of the respective pair of light spots, a difference in angles of the two light spots with the optical axis (sight axis) of the camera, a difference in center of gravity of the two light spots, a difference in color average of the two light spots, a difference in intensity average of the two light spots and/or an Euclidean distance between the two light spots, i.e., an Euclidean distance between the two light spots in a coordinate system with x and y axes. It is to be noted that the aforementioned features are only examples of possible features. It is also possible that the at least one feature, on which the calculation of the distance measure is based, is different from the aforementioned features. Further, additional features may belong to the aforementioned group of features.

In a further embodiment, the distance measure for a pair of light spots and for a feature i is a function of the term $$\left(\frac{f_i - \mu_i}{\sigma_i}\right)^2,$$

wherein $f_i$ is the value of the feature i for the respective two light spots, $\mu_i$ is a mean value of $f_i$ for a plurality of pairs of light spots and $\sigma_i$ is a standard deviation value of $f_i$ for the plurality of pairs of light spots. For example, if the feature i is the difference of the blob areas of the two light spots of a pair of light spots, then $f_i$ gives the value of the actual difference in the blob area of the two light spots. Further, the value $f_i$ may be calculated for a great number of different pairs of light spots which can be detected in the images captured by the camera. In particular, the value $f_i$ may be calculated for all pairs of light spots detected in the images captured by the camera. From these values of $f_i$, the mean value $\mu_i$ and the standard deviation $\sigma_i$ can be calculated. In other words, the mean value $\mu_i$ is the value $f_i$ for a typical or average pair of light spots.

The distance measure $d(f_i)$ for a pair of light spots and for the feature i may also be calculated by the following equation (1), wherein $\pi$ is the mathematical constant pi:

$$d(f_i) = \frac{1}{2}\left(\frac{f_i - \mu_i}{\sigma_i}\right)^2 + \log\sigma_i + \frac{1}{2}\log 2\pi \quad (1)$$

In case a plurality of features are considered to determine the similarity/dissimilarity of the light spots, the distance measure for a pair of light spots and for a plurality of features i is a function of the term $$\sum_{i=1}^{n_f}\left(\frac{f_i - \mu_i}{\sigma_i}\right)^2,$$

wherein $n_f$ is the number of the plurality of features.

The distance measure d for the $n_f$ features may also be calculated by the following equation (2), wherein the distance measure d is the sum of the distance measures of all single features:

$$d = \sum_{i=1}^{n_f} d(f_i) = \frac{1}{2}\sum_{i=1}^{n_f}\left(\frac{f_i - \mu_i}{\sigma_i}\right)^2 + \log\left(\prod_{i=1}^{n_f}\sigma_i\right) + \frac{1}{2}n_f\log 2\pi \quad (2)$$

The device may include a Bayes classifier which is used to calculate the distance measure for each of the plurality of pairs of light spots. A Bayes classifier is a probabilistic classifier based on applying the Bayes' theorem.

The Bayes classifier can be trained on labeled training data, in particular with pairs of headlights and tail lights. Thus, for training purposes, images can be input into the Bayes classifier, wherein it is known by the Bayes classifier whether the images show pairs of headlights and tail lights. The features used for the training of the Bayes classifier are selected by a sequential backward selection strategy out of a feature set. First, the Bayes classifier is trained on all of the features of the feature set. The performance of the Bayes classifier using all of the features is then evaluated. Subsequently, each feature is individually removed from the feature set and the Bayes classifier is trained on the remaining features of the feature set. For each of the reduced feature sets, the performance of the Bayes classifier is evaluated. After that the feature, the removal of which improved the performance of the Bayes classifier most, is permanently removed from the feature set. The process of removing a single feature from the feature set as explained is then started anew. This process is repeated until the removal of any other feature from the feature set only worsens the performance of the Bayes classifier. The remaining feature set can be considered as optimal in regard of the initially chosen set of features. The described process for the selection of the optimal features is carried out before the device is used for clustering light spots. During runtime, the calculation of the distance measure is based on the feature set that was selected before during the feature selection process.

The distance measure is calculated based on the trained Bayes classifier and the extracted standard deviation and mean value of the selected feature values. In the Bayes framework, the probability of a feature value $f_i$ under the condition that the light spots on which the feature i was calculated belongs to a pair of headlights or tail lights is calculated first. From this probability, which will be explained in more detail below, the distance measure can be calculated as given by equations (1) and (2).

In one embodiment, the device receives images captured by the camera in temporally successive frames. In each of the frames, the device may receive a single image. The device calculates a distance measure for each of a plurality of pairs of light spots detected in the image of one of the frames, e.g., the initial frame, and groups the light spots to clusters based on the calculated distance measures. Further, the device determines from the image of the subsequent frame which of the clusters still exist in the subsequent frame.

A cluster may still exist in the subsequent frame if the number of the light spots of the cluster that are detected in the subsequent frame exceeds a predetermined fraction of the number of the light spots of the cluster that were detected in the previous frame. In other words, the cluster still exists in the subsequent frame if a percentage of the light spots of the cluster that are detected in the subsequent frame exceeds a predetermined percentage value. For example, if a cluster contains 10 light spots in the previous frame and the predetermined fraction is ¾, i.e., 75%, then the cluster still exists in the subsequent frame if the cluster contains 8 or more light spots in the subsequent frame.

The device may further be configured to evaluate whether the light spots of one of the clusters in the subsequent frame are still connected to this cluster. For this purpose, the device may determine for each of the light spots of the cluster in the subsequent frame whether the distance measure of a respective light spot to at least one of the other light spots of the cluster is below a first predetermined threshold. If the distance measure of a light spot to at least one of the other light spots of the cluster is below the first predetermined threshold, this light spot is still connected to the cluster. If not, the light spot does not belong to this cluster any more. An iterative breadth-first-search algorithm may be executed for evaluating whether the light spots of a cluster in the subsequent frame are still connected to the cluster.

The device may further be configured to assign a light spot, which is detected in the subsequent frame and has not been assigned to a cluster, to one of the existing clusters or a new cluster if its distance measure to at least one of the light spots of one of the existing clusters or a new cluster is below a second predetermined threshold. The first predetermined threshold may be greater than the second predetermined threshold. This ensures a certain stability of the clusters as a light spot that was assigned to one of the clusters once will be assigned to this cluster as long as possible. An iterative breadth-first-search algorithm may be executed for assigning the light spots, which are detected in the subsequent frame, but have not been assigned to one of the clusters before, to one of the existing clusters or a new cluster.

The device may be further configured to merge clusters together that overlap each other.

In order to reduce the number of clusters to a predetermined number of clusters the device may further be configured to use a k-means clustering algorithm in order to merge clusters together.

In one embodiment, the light spots are spots of headlights and tail lights of vehicles. The camera may be mounted on a vehicle and may capture images of the traffic in front of the vehicle.

According to a further aspect of the invention, a system comprises a camera mounted on a vehicle and configured to capture images, and a device for clustering light spots as explained above.

According to yet a further aspect of the invention, a method for clustering light spots comprises the following steps. An image captured by a camera is received and light spots are detected in the image. Further, a distance measure is calculated for each of a plurality of pairs of light spots detected in the image, and the detected light spots are grouped to clusters based on the calculated distance measures.

The method may comprise the embodiments disclosed above in connection with the device for clustering light spots.

Further features and advantages will appear more clearly on a reading of the following detailed description of the preferred embodiment, which is given by way of non-limiting example only and with reference to the accompanying drawings.

BRIEF DESCRIPTION OF DRAWINGS

The invention will be described in more detail in the following in an exemplary manner with reference to an embodiment and to the drawings. There are shown in these:

FIG. 3 is a schematic representation of a further exemplary embodiment of a

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
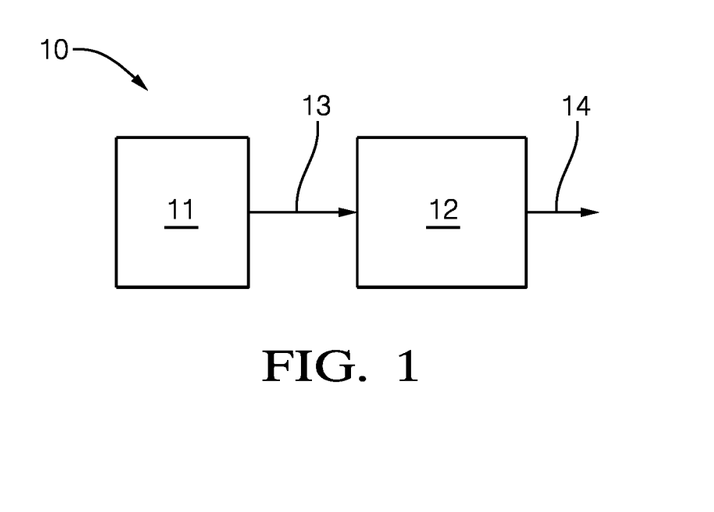
FIG. 1 is a schematic representation of an exemplary embodiment of a system including a device for clustering light spots.

FIG. 1 schematically illustrates a system 10 including a camera 11 and a device 12 that allows clustering light spots.

The camera 11 is mounted on a vehicle and captures images 13 of the area in front of the vehicle and thus the traffic in front of the vehicle. Alternatively, the camera 11 may be directed to an area in the rear and/or at a side of the vehicle.

Figure 2:
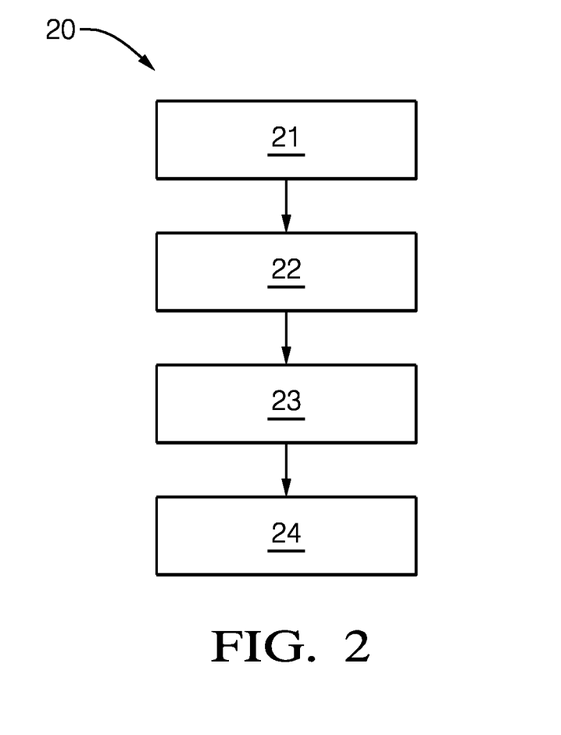
FIG. 2 is a schematic representation of an exemplary embodiment of a method for clustering light spots.

The images 13 captured by the camera 11 are fed to the device 12. The device 12 processes the images 13 and generates an output signal 14. The device 12 performs a method 20 for clustering light spots as schematically illustrated in FIG. 2.

In step 21 of the method 20, the device 12 receives an image 13, which was previously captured by the camera 11 and shows a road scene in front of the vehicle.

In step 22, the device 12 detects light spots in the image 13, in particular headlight spots and tail light spots of other vehicles.

In step 23, for each pair of light spots detected in the image 13, the device 12 calculates a distance measure.

In step 24, the device 12 groups the detected light spots to clusters based on the calculated distance measures. The clusters can be output by the device 12 as the output signal 14.

The device 12, the system 10 and the method 20 are exemplary embodiments according to the first, second and third aspect of the invention, respectively.

In the following embodiments and functions of the device 12, the system 10 and the method 20 are explained in more detail.

In current technology handpicked rules are used for the pairing and/or clustering of headlights and tail lights in image data. However, those rules may not be optimal and are not flexible. In order to overcome these disadvantages of conventional technology, an automatic feature selection algorithm is used to pick the best combination of features out of a large set of features. For example, in tests the best 6 features out of a set of 94 features were extracted.

The problem of the inflexibility of a hard threshold for every feature is solved by using a distance measure, which is based on a Bayes classifier and the mean as well as the standard deviation of the features.

For the feature selection process, a Bayes classifier is trained on labeled training data. The training data include images showing headlights and tail lights, in particular pairs of headlights and tail lights which are labelled accordingly. These images are input into the Bayes classifier in order to train the Bayes classifier. The features used for the training are selected by a sequential backward selection strategy out of a huge feature set. For example, in tests the initial feature set included 94 features.

The features are used to characterize the similarity or dissimilarity of the two light spots of a light spot pair. The set of features can include one or more of the following features: a difference in blob area between the two light spots of the respective pair of light spots, a difference in angles of the two light spots with the optical axis of the camera, a difference in center of gravity of the two light spots, a difference in color average of the two light spots, a difference in intensity average of the two light spots and an Euclidean distance between the two light spots, i.e., an Euclidean distance between the two light spots in a coordinate system with x and y axes. It is to be noted that the aforementioned features are only examples of possible features. The set of features may contain other features and/or additional features.

At the beginning of the feature selection process, the Bayes classifier is trained on all of the features of the feature set. The performance of the Bayes classifier using all of the features is then evaluated. Subsequently, each feature is individually removed from the feature set and the Bayes classifier is trained on the remaining features of the feature set. For each of the reduced feature sets, the performance of the Bayes classifier is evaluated. This allows to determine the removal of which feature improved the performance of the Bayes classifier most. This feature is then permanently removed from the feature set. Afterwards, the process of a removing a single feature from the feature set is repeated as long as the removal of any other feature from the feature set only worsens the performance of the Bayes classifier. The remaining feature set is considered as optimal in regard of the initially chosen set of features.

The trained Bayes classifier is used to calculate the distance measure. The Bayes classifier outputs the probability p of a feature value $f_i$ for a feature i under the condition that the two light spots, on which the feature value $f_i$ was calculated, are the light spots of the headlights or tail lights of the same vehicle:

$$p(f_i \mid \text{paired}) = \frac{1}{\sigma_i\sqrt{2\pi}} e^{-\frac{1}{2}\left(\frac{f_i - \mu_i}{\sigma_i}\right)^2} \qquad (3)$$

wherein $\mu_i$ is a mean value of $f_i$ for a plurality of pairs of light spots and $\sigma_i$ is a standard deviation value of $f_i$ for the plurality of pairs of light spots.

The distance measure $d(f_i)$ for the pair of light spots and for the feature i can be calculated by taking the logarithm of equation (3) and negating it:

$$d(f_i) = -\log p(f_i \mid \text{paired}) = \frac{1}{2}\left(\frac{f_i - \mu_i}{\sigma_i}\right)^2 + \log \sigma_i + \frac{1}{2}\log 2\pi \qquad (4)$$

In case $n_f$ features (with $n_f \geq 2$) are considered to determine the similarity or dissimilarity of the light spots, the distance measure d for the $n_f$ features can be calculated by the sum of the distance measures of all single features:

$$d = \sum_{i=1}^{n_f} d(f_i) = \frac{1}{2}\sum_{i=1}^{n_f}\left(\frac{f_i - \mu_i}{\sigma_i}\right)^2 + \log\left(\prod_{i=1}^{n_f}\sigma_i\right) + \frac{1}{2}n_f\log 2\pi \qquad (5)$$

Equation (4) or (5) can be used to calculate the distance measure d between light spots and clusters of light spots in order to group light spots to clusters and to decide to which cluster a specific light spot fits best.

Figure 3:
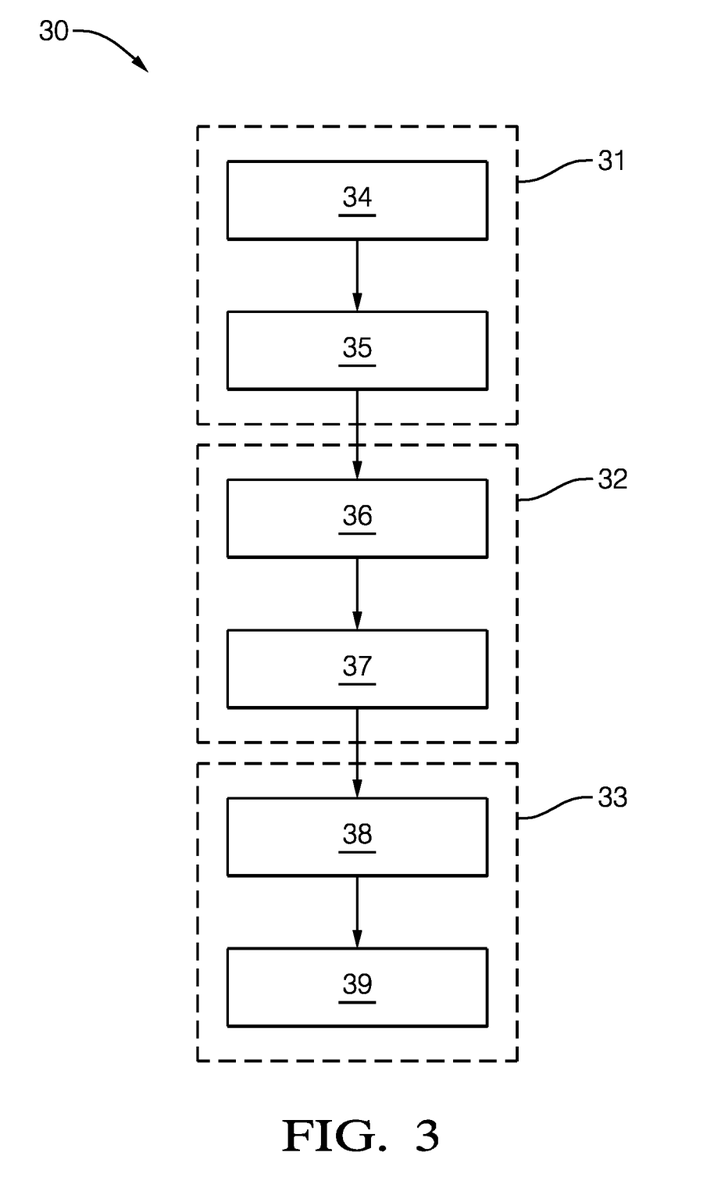

FIG. 3 illustrates a method 30 as a further exemplary embodiment of a method for clustering light spots. The method 30 can be performed by the device 12. The method 30 can be divided into three parts: preprocessing 31, clustering 32 and postprocessing 33. The preprocessing 31 includes steps 34 and 35, the clustering includes steps 36 and 37, and the postprocessing includes steps 38 and 39.

In step 34 of the method 30, the device 12 receives an image 13, which was previously captured by the camera 11 and shows a road scene in front of the vehicle. The device 12 receives the images 13 captured by the camera 11 in temporally successive frames. In each of the frames, the device 12 receives a single image 13.

Further, in step 34, the device 12 detects light spots in the image 13, which can be headlight spots or tail light spots of other vehicles. A Gaussian curve is applied on every detected light spot with a standard deviation dependent on the radius of the respective light spot and a coloring dependent on whether the respective light spot is a headlight or a tail light. Afterwards, the values of the Gaussian curves are summed up on the position of every detected light spot. The respective light spot is then ultimately classified on the coloring with the highest value, i.e., the respective light spot is classified to be a headlight or a tail light. This ensures that single false detections, for example, a false tail light in a cluster of many headlights, are smoothed out.

In step 35, the distance measure for every pair of light spots detected in the actual image 13 is calculated with the help of equation (4) or (5). For example, if the image 13 shows 4 light spots, then 6 pairs of light spots can be formed and for each of these pairs the distance measure can be calculated.

In steps 36 and 37, the detected light spots are grouped to clusters based on the calculated distance measures.

In step 36, it is evaluated which light clusters detected in the previous frame still exist in the image 13 of the actual frame. This is done by evaluating which light spots of the previous frame are still detected and matched in the actual frame, i.e., the frame subsequent to the previous frame. A cluster that was detected in the previous frame still exists in the actual frame if the number of the light spots of the cluster that are detected in the actual frame exceeds a predetermined fraction of the number of the light spots of the cluster that were detected in the previous frame. Thus, the cluster still exists if a percentage of the light spots of the cluster that are detected in the actual frame exceeds a predetermined percentage value.

Figure 4A:
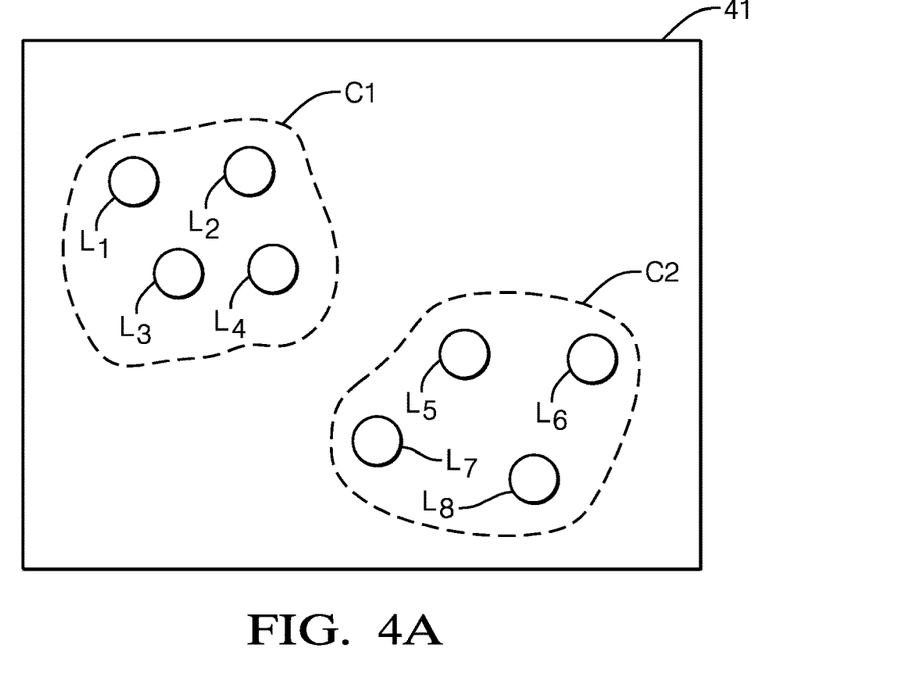
FIG. 4A is a schematic illustration of an image captured by a camera in a frame.
Figure 4B:
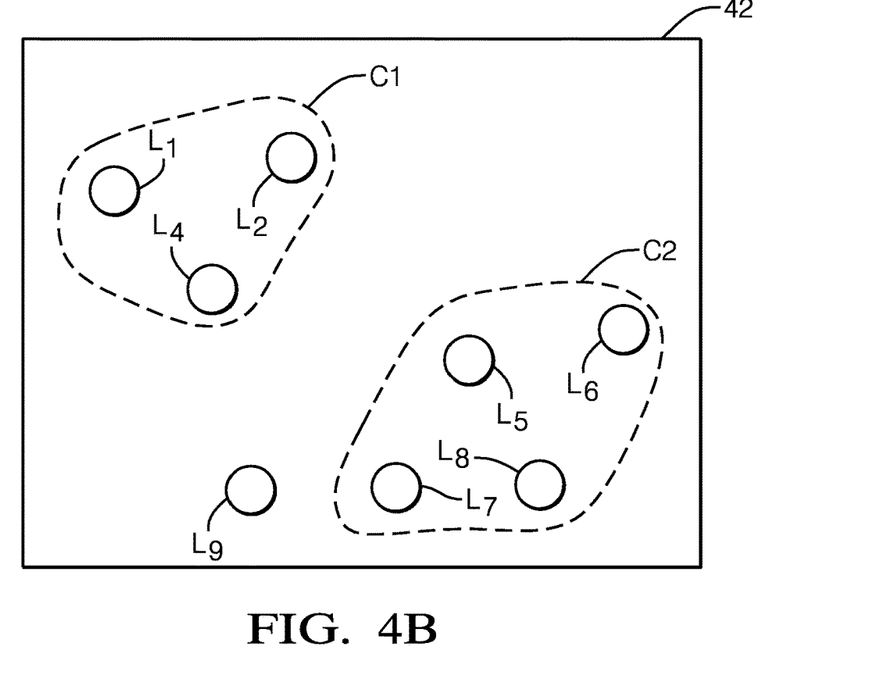
FIG. 4B is a schematic illustration of an image captured by the camera in a frame subsequent to the frame of FIG. 4A.

As an example, FIG. 4A schematically shows an image 41 captured in the previous frame and FIG. 4B schematically shows an image 42 captured in the actual frame. In the image 41, light spots $L_1$ to $L_8$ are detected. Further, light spots $L_1$ to $L_4$ are grouped to a cluster $C_1$ and light spots $L_5$ to $L_8$ are grouped to a cluster $C_2$. In the image 42, the light spots $L_1$, $L_2$, $L_4$ and $L_5$ to $L_8$ are detected, however the light spot $L_3$ detected in the previous frame is no longer detected in the actual frame. Further, a new light spot $L_9$ is detected in image 42.

The cluster $C_1$ in the image 42 thus contains 75% of the light spots of the cluster $C_1$ in the image 41. If the predetermined percentage value is 70%, the cluster $C_1$ in the image 42 exceeds this value so that it can be stated that the cluster $C_1$ still exists in the actual frame. The cluster $C_2$ also still exists in the actual frame since the cluster $C_2$ has the same number of light spots in both images 41 and 42.

In step 36, it is also evaluated if the light spots of a cluster are still connected in the actual frame, for example, by using an iterative breadth-first-search algorithm. A light spot is considered to be connected to the cluster if its distance measure to at least one of the other light spots of this cluster is below a first predetermined threshold $T_1$. In the example of FIGS. 4A and 4B, an iterative breadth-first-search algorithm can be executed for evaluating whether the light spots $L_1$, $L_2$, $L_4$ detected in the actual frame are connected to the cluster $C_1$ and the light spots $L_5$ to $L_8$ are connected to the cluster $C_2$.

In step 37, the remaining light spots are clustered and, if possible, clusters are merged. For this purpose, an iterative breadth-first-search algorithm can be performed running over all light spots light spots $L_1$, $L_2$, $L_4$ and $L_5$ to $L_9$ that are detected in the image 42. In particular, it is evaluated if the distance measure of a remaining light spot, i.e., the light spot $L_9$, to at least one of the light spots of one of the existing clusters or a new cluster is below a second predetermined threshold $T_2$, wherein the second predetermined threshold $T_2$ is smaller than the first predetermined threshold $T_1$. There are the following options for the result of step 37:

Clusters $C_1$ and $C_2$ remain as they are and a new cluster $C_3$ is formed containing only light spot $L_9$ as light spot $L_9$ is not connected to one of the clusters $C_1$ and $C_2$;

light spot $L_9$ is assigned to cluster $C_1$ as light spot $L_9$ is connected to cluster $C_1$;

light spot $L_9$ is assigned to cluster $C_2$ as light spot $L_9$ is connected to cluster $C_2$;

a new cluster $C_3$ is formed containing light spot $L_9$ and clusters $C_1$ and $C_2$ are merged to a single cluster as light spot $L_9$ is not connected to one of the clusters $C_1$ and $C_2$ and at least some of the light spots of clusters $C_1$ and $C_2$ are connected to the other cluster; and clusters $C_1$ and $C_2$ and light spot $L_9$ are merged to a single cluster.

It is to be noted that for the initial frame when clusters have not been formed yet, two light spots form a new cluster if their distance measure is below the second predetermined threshold. Another light spot may be assigned to this cluster if its distance measure to at least one of the light spots of this cluster is also below the second predetermined threshold.

In step 38, overlapping clusters are merged together in the actual frame.

In step 39, a k-means clustering algorithm is executed in order to limit the number of clusters to a predetermined number $L_c$. The centers of the light clusters that were also detected in the previous frame are chosen as the initial cluster centers to gain temporal consistency. Further, the centers of randomly chosen remaining light clusters are chosen as further initial cluster centers. Execution of the k-means clustering algorithm will merge together the closest light clusters until exactly $L_c$ light clusters remain.

While this invention has been described in terms of the preferred embodiments thereof, it is not intended to be so limited, but rather only to the extent set forth in the claims that follow.

I claim:

1. A device for clustering light spots,
   wherein the light spots are spots of headlights and tail lights of vehicles;
   the device is configured to:
   receive an image captured by a camera;
   detect light spots in the image;
   calculate a distance measure for each of a plurality of pairs of light spots detected in the image based on two or more features of the two light spots of the respective pair, wherein the distance measure quantifies a dissimilarity of features between each of the plurality of pairs of light spots; and
   group the detected light spots to form clusters based on the calculated distance measures,
   wherein two light spots form a new cluster if their distance measure is below a predetermined threshold $T_2$, and
   a third light spot is assigned to the cluster if a distance measure to at least one of the two light spots of the cluster is below the predetermined threshold $T_2$.

2. The device as claimed in claim 1, wherein the at least two features of the two light spots of the respective pair are selected from the following group of features: a difference in blob area of the two light spots, a difference in angle with the optical axis of the camera between the two light spots, a difference in center of gravity of the two light spots, a difference in color average of the two light spots, a difference in intensity average of the two light spots and an Euclidean distance between the two light spots.

3. The device as claimed in claim 1, wherein the distance measure for a respective pair of light spots and for a feature i is a function of $((fi-\mu i)/\sigma i)^2$, wherein fi is the value of the feature i for the two light spots of the respective pair, $\mu i$ is a mean value of fi for a plurality of pairs of light spots and $\sigma i$ is a standard deviation value of fi for the plurality of pairs of light spots.

4. The device as claimed in claim 3, wherein the distance measure for the respective pair of light spots and for a plurality of features i is a function of $\Sigma(i=1, nf)[((fi-\mu i)/\sigma i)^2]$, wherein nf is the number of the plurality of features.

5. The device as claimed in claim 1, wherein the device comprises a Bayes classifier and the device is further configured to use the Bayes classifier to calculate the distance measure for each of the plurality of pairs of light spots.

6. The device as claimed in claim 1, wherein the device is further configured to:
receive images captured by the camera in temporally successive frames;
group the light spots detected in the image of one of the frames to clusters based on the calculated distance measures; and
determine which of the clusters still exist in the subsequent frame.

7. The device as claimed in claim 6, wherein a cluster still exists in the subsequent frame if the number of the light spots of the cluster that are detected in the subsequent frame exceeds a predetermined fraction of the number of the light spots of the cluster that were detected in the previous frame.

8. The device as claimed in claim 6, wherein the device is further configured to
determine for a light spot of one of the clusters in the subsequent frame whether the distance measure of the respective light spot to at least one of the other light spots of the cluster is below a further predetermined threshold $T^1$ in order to evaluate whether the respective light spot belongs to the cluster in the subsequent frame.

9. The device as claimed in claim 8, wherein the further predetermined threshold $T_1$ is greater than the predetermined threshold $T_2$.

10. The device as claimed in claim 1, wherein the device is further configured to merge together overlapping clusters.

11. The device as claimed in claim 1, wherein the device is further configured to use a k-means clustering algorithm in order to merge clusters together.

12. A system, comprising:
a camera mounted on a vehicle and configured to capture images; and
a device for clustering light spots as claimed in claim 1.

13. A method for clustering light spots of headlights and tail lights of vehicles, comprising:
receiving an image captured by a camera;
detecting light spots in the image;
calculating a distance measure for each of a plurality of pairs of light spots detected in the image based on two or more features of the two light spots of the respective pair, wherein the distance measure quantifies a dissimilarity of features between each of the plurality of pairs of light spots; and
grouping the detected light spots to clusters based on the calculated distance measures wherein two light spots form a new cluster if their distance measure is below a predetermined threshold $T_2$, and
a third light spot is assigned to the cluster if its distance measure to at least one of the two light spots of the cluster is below the predetermined threshold $T_2$.

14. The method as claimed in claim 13, wherein the at least two features of the two light spots of the respective pair are selected from the following group of features: a difference in blob area of the two light spots, a difference in angle with the optical axis of the camera between the two light spots, a difference in center of gravity of the two light spots, a difference in color average of the two light spots, a difference in intensity average of the two light spots and an Euclidean distance between the two light spots.

15. The method as claimed in claim 13, wherein the distance measure for a respective pair of light spots and for a feature i is a function of $((fi - \mu i)/\sigma i)^2$, wherein fi is the value of the feature i for the two light spots of the respective pair, $\mu i$ is a mean value of fi for a plurality of pairs of light spots and $\sigma i$ is a standard deviation value of fi for the plurality of pairs of light spots.

16. The method as claimed in claim 15, wherein the distance measure for the respective pair of light spots and for a plurality of features i is a function of $\Sigma(i=1, nf)[((fi - \mu i)/\sigma i)^2]$, wherein nf is the number of the plurality of features.

17. The method as claimed in claim 13, wherein the device comprises a Bayes classifier and the device is further configured to
use the Bayes classifier to calculate the distance measure for each of the plurality of pairs of light spots.

18. The method as claimed in claim 13, wherein the device is further configured to
receive images captured by the camera in temporally successive frames;
group the light spots detected in the image of one of the frames to clusters based on the calculated distance measures; and
determine which of the clusters still exist in the subsequent frame.

19. The method as claimed in claim 18, wherein a cluster still exists in the subsequent frame if the number of the light spots of the cluster that are detected in the subsequent frame exceeds a predetermined fraction of the number of the light spots of the cluster that were detected in the previous frame.

20. The device as claimed in claim 1, wherein the device is further configured to assign a light spot, which is detected in the subsequent frame and does not belong to a cluster, to one of the existing clusters or a new cluster of the subsequent frame if its distance measure to at least one of the light spots of one of the existing clusters or a new cluster is below the predetermined threshold $T_2$.

21. The method as claimed in claim 18, wherein the device is further configured to determine for a light spot of one of the clusters in the subsequent frame whether the distance measure of the respective light spot to at least one of the other light spots of the cluster is below a further predetermined threshold $T_1$ in order to evaluate whether the respective light spot belongs to the cluster in the subsequent frame.

22. The method as claimed in claim 21, wherein the further predetermined threshold $T_1$ is greater than the predetermined threshold $T_2$.

23. The method as claimed in claim 22, wherein the device is further configured to assign a light spot, which is detected in the subsequent frame and does not belong to a cluster, to one of the existing clusters or a new cluster of the subsequent frame if its distance measure to at least one of the light spots of one of the existing clusters or a new cluster is below the predetermined threshold $T_2$.

24. The method as claimed in claim 13, further including the step of merging together overlapping clusters.

25. The method as claimed in claim 13, further including the step of using a k-means clustering algorithm in order to merge clusters together.

* * * * *